United States Patent
Schirmeier et al.

(10) Patent No.: US 12,306,025 B2
(45) Date of Patent: May 20, 2025

(54) VORTEX FLOW METER AND METHOD FOR TESTING A VORTEX FLOW METER

(71) Applicant: Endress+Hauser Flowtec AG, Reinach (CH)

(72) Inventors: Timo Schirmeier, Schopfheim (DE); Werner Tanner, Lausen (CH); Dieter Schweizer, Bubendorf (CH)

(73) Assignee: Endress+Hauser Flowtec AG, Reinach (CH)

( * ) Notice: Subject to any disclaimer, the term of this patent is extended or adjusted under 35 U.S.C. 154(b) by 224 days.

(21) Appl. No.: 18/258,029

(22) PCT Filed: Nov. 26, 2021

(86) PCT No.: PCT/EP2021/083216
§ 371 (c)(1),
(2) Date: Jun. 16, 2023

(87) PCT Pub. No.: WO2022/128418
PCT Pub. Date: Jun. 23, 2022

(65) Prior Publication Data
US 2024/0053178 A1 Feb. 15, 2024

(30) Foreign Application Priority Data

Dec. 17, 2020 (DE) ..................... 10 2020 134 066.4

(51) Int. Cl.
*G01F 1/32* (2022.01)
*G01F 1/325* (2022.01)

(52) U.S. Cl.
CPC .......... *G01F 1/3218* (2013.01); *G01F 1/3287* (2022.01)

(58) Field of Classification Search
CPC . G01F 1/32–3218; G01F 1/325; G01F 1/3287
See application file for complete search history.

(56) References Cited

U.S. PATENT DOCUMENTS

| 4,164,143 A | 8/1979 | Anderson |
| 4,910,994 A | 3/1990 | Lew |

(Continued)

FOREIGN PATENT DOCUMENTS

| DE | 69610183 T2 | 6/2001 |
| DE | 102007031168 B3 | 1/2009 |

(Continued)

OTHER PUBLICATIONS

Wikipedia, Operationsverstärker, https://de.wikipedia.org/w/index.php?title=Operationsverstäker&oldid=206502830, 22 pp. (last accessed Sep. 10, 2021).

*Primary Examiner* — Erika J. Villaluna
(74) *Attorney, Agent, or Firm* — Mark A. Logan; Endress+Hauser (USA) Holding, Inc.

(57) ABSTRACT

A vortex flow meter comprises a measuring tube; a bluff body arranged in the measuring tube; a sensor device, having a paddle, a sensor main body and a piezo element, and an electronic operating circuit. The electronic operating circuit has a measuring circuit comprising an operational amplifier and a capacitor. The first capacitor forms a feedback between the output and the measurement input, wherein the reference input can be supplied with a first reference voltage. The measurement circuit has a first switch, wherein the electronic operating circuit is designed to connect the piezo element via the first switch to the measurement input of the operational amplifier and to charge it with a first charging voltage by means of a second switch position. The electronic operating circuit derives an information relating to a state of the piezo element from a discharge process of the piezo element.

7 Claims, 3 Drawing Sheets

(56) References Cited

U.S. PATENT DOCUMENTS

| | | | |
|---|---|---|---|
| 6,147,433 A | 11/2000 | Reineke et al. | |
| 9,310,412 B2 | 4/2016 | Arunachalam et al. | |
| 2003/0038644 A1 | 2/2003 | Kleven | |
| 2019/0390986 A1* | 12/2019 | Foster | G01F 1/3287 |
| 2021/0231472 A1* | 7/2021 | Bogdanov | G01F 25/10 |

FOREIGN PATENT DOCUMENTS

| | | |
|---|---|---|
| DE | 102009001525 A1 | 9/2010 |
| DE | 102013110243 A1 | 4/2015 |
| EP | 2274510 B1 | 3/2012 |
| GB | 637112 A | 5/1950 |

\* cited by examiner

VORTEX FLOW METER AND METHOD FOR TESTING A VORTEX FLOW METER

CROSS-REFERENCE TO RELATED APPLICATIONS

The present application is related to and claims the priority benefit of DPMA Patent Application No. 10 2020 134 066.4, filed on Dec. 17, 2020, and International Patent Application No. PCT/EP2021/083216, filed Nov. 26, 2021, the entire contents of which are incorporated herein by reference.

TECHNICAL FIELD

The invention relates to a vortex flow meter for measuring a flow of a medium flowing through a pipeline and a method for testing a vortex flow meter.

BACKGROUND

Vortex flow measuring devices, as shown for example in DE102009001525A1, have a measuring tube in which are arranged a bluff body for generating flow vortices and a paddle for detecting these flow vortices. In this case, the paddle is deflected by the flow vortices and causes deformations of a main body which are usually detected by means of a piezo element. A measurement quality depends in this case on a connection of the piezo element and/or on a state of the piezo element.

SUMMARY

It is an object of the invention to propose a vortex flow meter having a simple and robust verifiability of a device state, and a method for testing the vortex flow meter.

The object is achieved by a vortex flow meter-according to independent claim 1, and by a method according to the present disclosure.

A vortex flow meter according to the invention for measuring a flow of medium flowing through a pipeline comprises:

- a measuring tube for guiding the medium with a measuring tube wall and a measuring tube lumen formed by the measuring tube wall, the measuring tube wall having an opening;
- a bluff body arranged in the measuring tube;
- a sensor device which is designed to detect flow vortices caused by the bluff body,
  wherein the sensor device has a paddle, a sensor main body and a piezo element,
  wherein the sensor main body is arranged in the opening and seals media-tight with the measuring tube wall,
  wherein the paddle projects into the measuring tube lumen and is designed to be deflected by flow vortices from a force-free resting position,
  wherein the piezo element is arranged on a rear side of the sensor main body facing away from the measuring tube and is designed to detect deformations of the sensor main body caused by deflections of the paddle and to convert them into an electrical measurement signal;
- an electronic operating circuit which is designed to detect and evaluate the measurement signal by means of an evaluation circuit and to provide flow measurement values, wherein the electronic operating circuit has a measuring circuit comprising an operational amplifier with an inverting input, a non-inverting input, and an output, and a first capacitor, wherein the first capacitor forms a feedback between the output and the inverting input or the non-inverting input, wherein the respective input is a measurement input, wherein the respective other input is a reference input and can be supplied with a first reference voltage, and wherein the output is connected to an evaluation circuit of the electronic operating circuit, wherein the piezo element can be supplied with a second reference voltage on a side facing away from the operational amplifier, wherein the measuring circuit has a first switch, wherein the electronic operating circuit is designed to connect the piezo element via the first switch to the measurement input of the operational amplifier by means of a first switch position and to charge it with a first charging voltage by means of a second switch position, wherein the electronic operating circuit is designed by means of the evaluation circuit to derive from a discharge process of the piezo element an information relating to a state of the piezo element, and/or an electrical connection of the piezo element to the electronic operating circuit, and/or a mechanical connection to the sensor main body.

Thus, by means of the first switch, by discharging the piezo element after charging with the first charging voltage, information regarding the state can be obtained in a particularly simple manner from the discharge process, or from a discharge measurement signal output via the output by means of the operational amplifier during the discharge process.

An input signal at the measurement input during the discharge of the piezo element is composed of a discharge voltage and high-frequency voltage oscillations, caused by switching into the first switch position, wherein a characteristic of the discharge voltage carries information regarding a capacitance of the piezo element, wherein the oscillations carry an information regarding the state of the piezo element and/or the electrical connection of the piezo element with the electronic operating circuit and/or the mechanical connection to the sensor main body.

The discharge of the piezo element takes place via the measurement input of the operational amplifier, or if present, via a parallel resistor to the first capacitor.

In one embodiment, the measuring circuit has a second capacitor and a second switch, wherein the second capacitor can be supplied with the second reference voltage, wherein the electronic operating circuit is designed to connect the second capacitor via the second switch to the measurement input of the operational amplifier by means of a first switch position and to charge it with a second charging voltage by means of a second switch position, wherein the first charging voltage and the second reference voltage define a first differential voltage, and wherein the second charging voltage and the second reference voltage define a second differential voltage, wherein the second differential voltage has a polarity opposite to the first differential voltage, wherein the second capacitor and the piezo element can be connected in parallel via the switches.

In this way, the influence of the discharge voltage can be mitigated from the input signal, so that the high-frequency oscillations can be read out with high voltage resolution.

In one embodiment, the electronic operating circuit is designed to charge the piezo element with a first charge and the second capacitor with a second charge with respect to the second reference voltage, wherein an amount of the first charge and an amount of the second charge deviate less than 10% and in particular less than 5% from an average value of the charges.

In this way, a sufficiently high voltage resolution can be achieved.

In one embodiment, the operational amplifier has an input voltage range with a first limit value and a second limit value and an average value, wherein the first reference voltage deviates from the average value, for example, less than 10%, and in particular less than 5% and preferably less than 3%.

In this way, the input signal at the measurement input can be mapped to the output substantially without distortions and with sufficiently high amplification.

In one embodiment, the piezo element has a maximum capacitance, wherein the second capacitor has a nominal capacitance, wherein the nominal capacitance is at least as large as the maximum capacitance and, for example, at least 5% and in particular at least 10% and preferably at least 20% greater than the first maximum capacitance.

A thickness of the, for example, disk-shaped piezo element is temperature-dependent since a manufacturing material of the piezo element also has a coefficient of thermal expansion unequal to zero. For example, the piezo element may experience an increase in its capacitance under increasing temperatures. Operating temperature limits or medium temperature limits or process temperature limits therefore define a capacitance range or maximum capacitance of the piezo element.

Using a second capacitor with a nominal capacitance of at least the maximum capacitance, can ensure that the second capacitor can be charged with a second charge which is at least equal in magnitude to the first charge.

As a result, a capacitance drift of the piezo element, for example from a temperature change, is unproblematic.

In a method according to the invention for testing a piezo element of a vortex flow meter according to the invention, in a first method step, the first switch is switched from a first switch position to a second switch position in order to charge the piezo element, wherein after charging the piezo element, in a second method step, the first switch is switched to the first switch position in order to discharge the piezo element, wherein the electronic operating circuit detects the discharge process by means of the operational amplifier and derives an information regarding a state of the piezo element and/or an electrical connection of the piezo element from a measurement signal generated by the discharging process.

In one embodiment, in the first method step, the second switch is switched from a first switch position to a second switch position in order to charge the second capacitor, wherein in the second method step, the second switch is switched to the first switch position at the same time as the first switch in order to discharge the second capacitor.

In this way, the influence of the discharge voltage can be mitigated from the input signal, so that the high-frequency oscillations can be read out with high voltage resolution.

BRIEF DESCRIPTION OF THE DRAWINGS

The invention will now be described with reference to exemplary embodiments.

DETAILED DESCRIPTION

Figure 1:
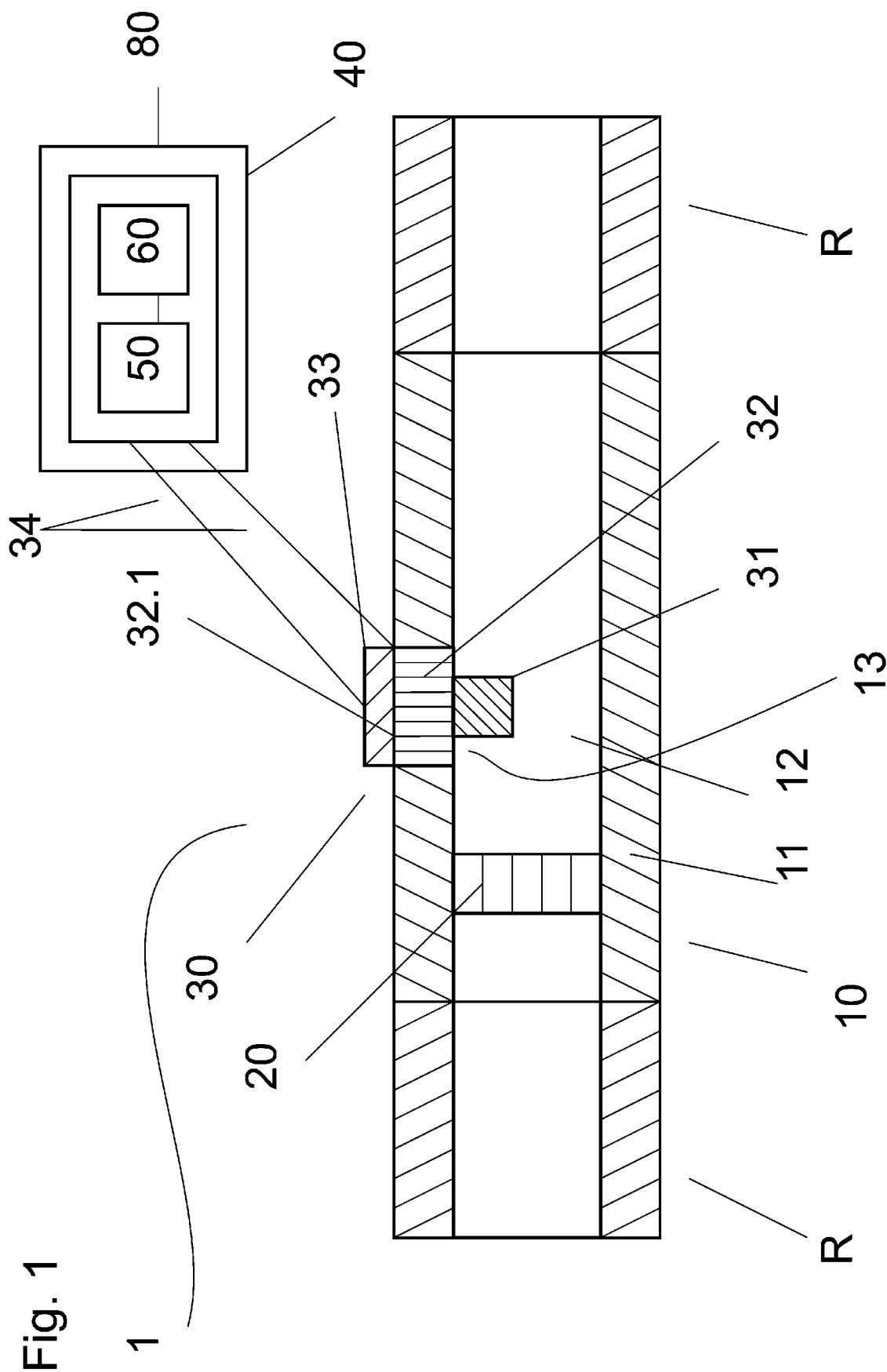
FIG. 1 outlines an exemplary vortex flow meter.

FIG. 1 outlines a schematic longitudinal section through an exemplary vortex flow meter 1 which is mounted in a pipeline R by means of a measuring tube 10. The measuring tube 10 has a measuring tube wall 11 which forms a measuring tube lumen 12 and has an opening 13 for receiving a sensor main body 32 of a sensor device 20, wherein the sensor main body seals the opening 13 in a media-tight manner.

Arranged in the measuring tube is a bluff body 20 which generates vortices in a flowing medium and therefore local pressure fluctuations which are detected by a paddle 31 of the sensor device arranged downstream. In doing so, the paddle is deflected out of a force-free resting position and in doing so deforms the sensor main body. A piezo element 33 is arranged on a rear side 32.1 of the sensor main body and is designed to convert the deformations of the sensor main body into a measurement signal in the form of a characteristic of an electrical voltage. A measuring circuit 50 of an electronic operating circuit 40 is designed to tap the electrical voltage by means of an electrical connection 34. Here, the piezo element can be formed substantially disk-shaped with two opposite side surfaces, each of which side surfaces have an electrically conductive coating for the purpose of tapping the electrical voltage generated by deformation. An evaluation circuit 60 of the electronic operating circuit is designed to evaluate the electrical voltage or a characteristic of the electrical voltage.

Figure 2:
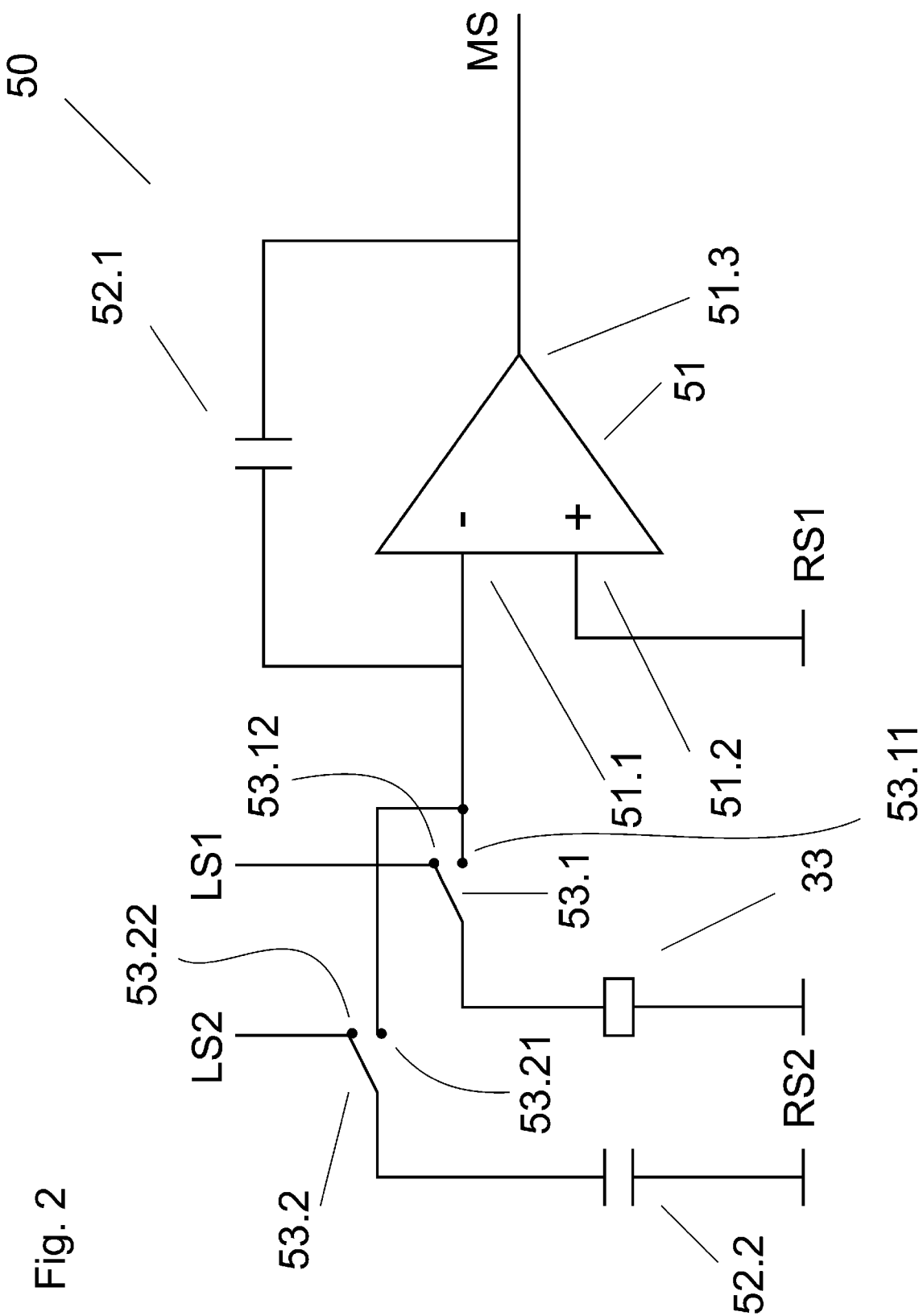
FIG. 2 outlines an exemplary measuring circuit according to the present disclosure.

FIG. 2 outlines an exemplary embodiment according to the invention of a measuring circuit 50 of an electronic operating circuit 40 of a vortex flow meter and a piezo element 33 connected thereto. The measuring circuit has an operational amplifier 51 with an inverting input 51.1, a non-inverting input 51.2 and an output 51.3. A first capacitor 52.1 connects a measurement input, here the inverting input, to the output of the operational amplifier, wherein the piezo element 33 can be connected to the measurement input, here the inverting input. The piezo element is designed to convert deformations of the sensor main body into a measurement signal.

The operational amplifier is supplied via a reference input, here the non-inverting input, with a reference voltage RS1 which is preferably in a medium voltage range of an input voltage range of the operational amplifier. In this way, an oscillation of an electrical voltage supplying the measuring input can be mapped onto the output 51.3 with at most low distortion and sufficient amplification since the oscillations thus do not reach a modulation range of the operational amplifier. In one embodiment, the operational amplifier has an input voltage range with a first limit value and a second limit value and an average value, wherein the first reference voltage deviates from the average value, for example, by less than 30%, and in particular less than 20% and preferably less than 10%.

According to the invention, a first switch 53.1 with a first switch position 53.11 and a second switch position 53.12 is arranged between the piezo element and the measurement input, wherein the piezo element is connected to the measurement input in the first switch position. For the purpose of testing a state of the piezo element and/or an electrical connection of the piezo element to the electronic operating circuit and/or a mechanical connection to the sensor main body, the piezo element can be charged with a first charging voltage LS1 by means of the first switch in the second switch position. When switched back to the first switch position, the measurement input of the operational amplifier discharges the piezo element 33 via the measurement input in a characteristic manner. An input signal at the measurement input during the discharge of the piezo element is composed of a discharge voltage and high-frequency voltage oscillations, caused by switching into the first switch position, wherein a characteristic of the discharge voltage carries information regarding a capacitance of the piezo element, wherein the oscillations carry an information regarding the state of the piezo element and/or the electrical connection of the piezo element with the electronic operating circuit and/or the mechanical connection to the sensor main body.

The piezo element can be supplied with a second reference voltage on a side facing away from the operational amplifier, wherein the second reference voltage deviates less than 30%, and in particular less than 20%, and preferably less than 10% from the first reference voltage, wherein the second reference voltage can be, for example, equal to the first reference voltage. In this way, an oscillation of an electrical voltage supplying the measuring input can be mapped onto the output 51.3 with at most low distortion and sufficient amplification since the oscillations thus do not reach a modulation range of the operational amplifier.

A resistor element can be connected in parallel with the first capacitor 52.1 (not shown), which is designed to prevent a full charge of the first capacitor. Here, the resistor element is high-resistance so that the dynamics of the input signal of the piezo element are only marginally affected. A person skilled in the art can select such a resistor element without any problems.

In one embodiment of the invention, a second capacitor 52.2 can be arranged as shown here, which can be connected in parallel to the piezo element via a second switch 53.2. According to the invention, the second capacitor can be supplied with the second reference voltage, wherein the electronic operating circuit 40 is designed to connect the second capacitor via the second switch 53.2 by means of a first switch position 53.21 to the measurement input of the operational amplifier and to charge it by means of a second switch position 53.22 with a second charging voltage LS 2, wherein the first charging voltage and the second reference voltage define a first differential voltage, and wherein the second charging voltage and the second reference voltage define a second differential voltage, wherein the second differential voltage has a polarity opposite to the first differential voltage. The second capacitor and the piezo element can be connected in parallel via the switches 53.1, 53.2 by means of the respective first switch position 53.11, 53.21.

In particular, the electronic operating circuit 40 is designed, with respect to the second reference voltage, to charge the piezo element 33 with a first charge and the second capacitor with a second charge, wherein an amount of the first charge and an amount of the second charge deviate less than 10% and in particular less than 5% from an average value of the charges. The electronic operating circuit can determine charges for example via time integration of charging currents. By simultaneously switching the first switch and the second switch in the respective first circuit, the piezo element and the second capacitor are connected in parallel so that the discharge curve of the second capacitor and the discharge curve of the piezo element compensate each other. In this way, the measurement input of the operational amplifier is supplied substantially only by the oscillations of the piezo element, which can thus be amplified better than without compensation of the discharge curves.

In one embodiment, the piezo element has a maximum capacitance, wherein the second capacitor has a nominal capacitance, wherein the nominal capacitance is at least as large as the maximum capacitance and, for example, at least 5% and in particular at least 10% and preferably at least 20% greater than the first maximum capacitance.

A thickness of the, for example, disk-shaped piezo element is temperature-dependent since a manufacturing material of the piezo element also has a coefficient of thermal expansion unequal to zero. Typically, the coefficient of thermal expansion is greater than zero so that the piezo element shrinks at falling temperatures and increases its capacitance. A minimum operating temperature or media temperature or process temperature thus defines a maximum capacitance of the piezo element.

Figure 3:
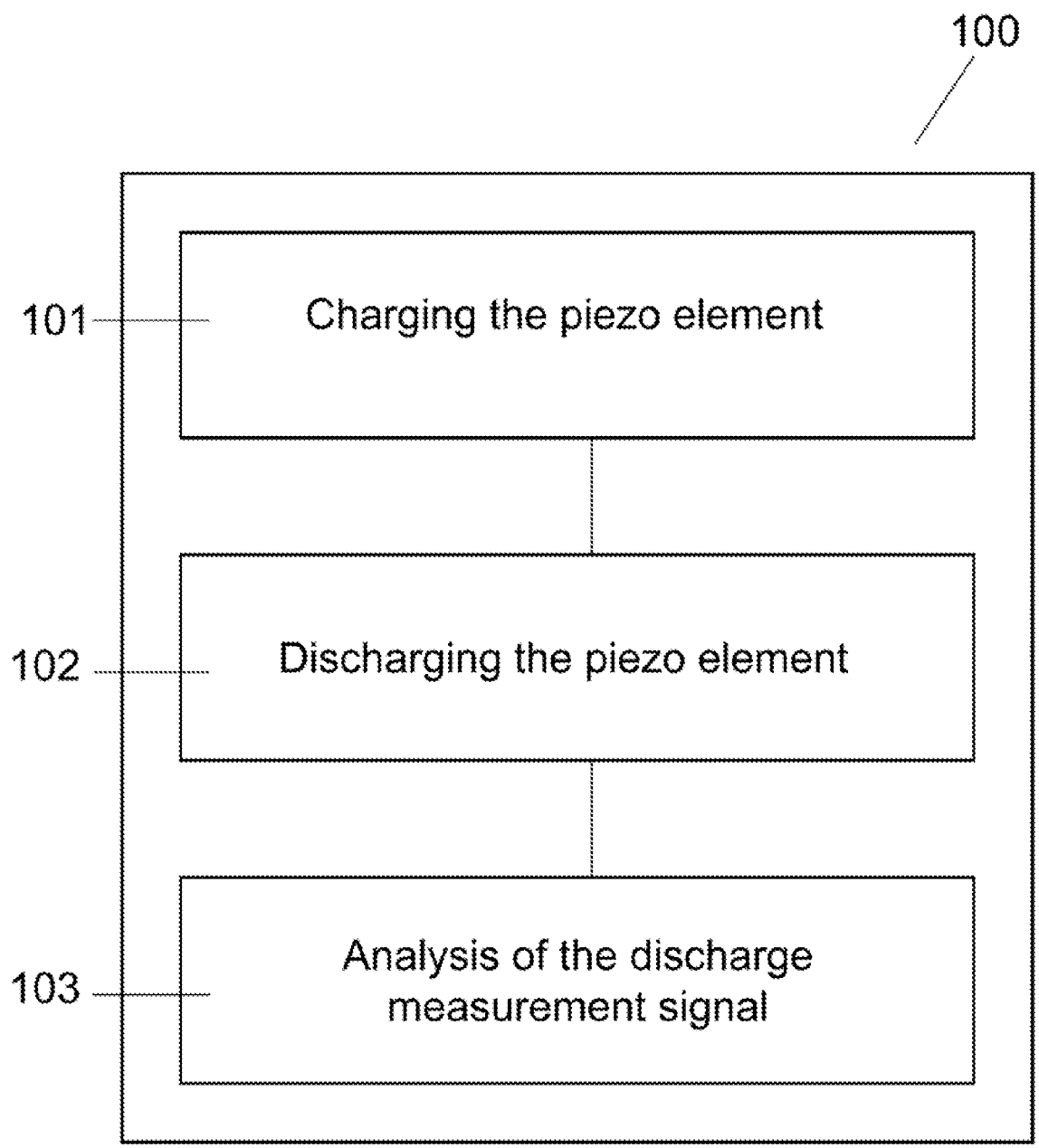
FIG. 3 outlines an exemplary method according to the present disclosure.

FIG. 3 outlines the sequence of an exemplary method according to the invention, wherein in a first method step 101, the first switch 53.1 is switched from the first switch position 53.11 to the second switch position 53.12 in order to charge the piezo element, wherein after charging the piezo element 33, in a second method step 102, the first switch is switched to the first switch position in order to discharge the piezo element, wherein the electronic operating circuit 40 detects the discharge process and, in a third method step 103, derives an information relating to a state of the piezo element 33 and/or an electrical connection 34 of the piezo element from a discharge measurement signal.

In one embodiment, in the first method step 101, the second switch 53.2 is switched from a first switch position 53.21 to a second switch position 53.22 in order to charge the second capacitor 52.2, wherein in the second method step 102, the second switch 53.2 is switched into the respective first switch position 53.11, 53.21 at the same time as the first switch 53.1 in order to discharge the second capacitor. By simultaneously switching the first switch and the second switch in the respective first circuit, the piezo element and the second capacitor are connected in parallel so that the discharge curve of the second capacitor and the discharge curve of the piezo element compensate each other. In this way, the measurement input of the operational amplifier is supplied substantially only by the oscillations of the piezo element, which can thus be amplified better than without compensation of the discharge curves.

The invention claimed is:

1. A vortex flow meter for measuring a flow of medium flowing through a pipeline, comprising:
   a measuring tube for guiding the medium with a measuring tube wall and a measuring tube lumen formed by the measuring tube wall, wherein the measuring tube wall has an opening;
   a bluff body arranged in the measuring tube;
   a sensor device designed to detect flow vortices caused by the bluff body, the sensor device including a paddle, a sensor main body, and a piezo element, wherein the sensor main body is arranged in the opening and seals media-tight with the measuring tube wall, wherein the paddle projects into the measuring tube lumen and is designed to be deflected by flow vortices from a force-free resting position, and wherein the piezo element is arranged on a rear side of the sensor main body facing away from the measuring tube and is designed to detect deformations of the sensor main body caused by deflections of the paddle and to convert the deformations into an electrical measurement signal; and an electronic operating circuit designed to detect and evaluate the measurement signal via an evaluation circuit and to provide flow measurement values, wherein the electronic operating circuit includes a measuring circuit including an operational amplifier having an inverting input, a non-inverting input and an output, and further includes a first capacitor, wherein the first capacitor forms a feedback between the output and the inverting input or the non-inverting input, wherein the respective input is a measurement input, wherein the respective other input is a reference input and can be supplied with a first reference voltage, and wherein the output is connected to the evaluation circuit of the electronic operating circuit, wherein the piezo element can be supplied with a second reference voltage on a side facing away from the operational amplifier, which is equal to the first reference voltage, wherein the measuring circuit further includes a first switch having a first position and a second position, wherein the electronic operating circuit is designed to connect the piezo element via the first position of the first switch to the measurement input of the operational amplifier and to charge the piezo element with a first charging voltage via the second position of the first switch, and wherein the electronic operating circuit is further designed to derive via the evaluation circuit from a discharge process of the piezo element an information relating to a state of the piezo element, and/or an electrical connection of the piezo element to the electronic operating circuit, and/or a mechanical connection to the sensor main body.

2. The vortex flow meter according to claim 1, wherein the measuring circuit further includes a second capacitor and a second switch, the second switch having a first position and a second position, wherein the second capacitor can be supplied with the second reference voltage, wherein the electronic operating circuit is further designed to connect the second capacitor via the first position of the second switch to the measurement input of the operational amplifier and to charge the second capacitor with a second charging voltage via the second position of the second switch, wherein the first charging voltage and the second reference voltage define a first differential voltage, and wherein the second charging voltage and the second reference voltage define a second differential voltage, wherein the second differential voltage has a polarity opposite to the first differential voltage, and wherein the second capacitor and the piezo element can be connected in parallel via the respective first position of the first and second switches.

3. The vortex flow meter according to claim 2, wherein the electronic operating circuit is designed to charge the piezo element with a first charge and the second capacitor with a second charge with respect to the second reference voltage, wherein an amount of the first charge and an amount of the second charge deviates less than 10% from an average value of the charges.

4. The vortex flow meter according to claim 3, wherein the operational amplifier has an input voltage range with a first limit value and a second limit value and an average value, wherein the first reference voltage deviates from the average value by less than 10%.

5. The vortex flow meter according to claim 4, wherein the piezo element has a maximum capacitance, wherein the second capacitor has a nominal capacitance, wherein the nominal capacitance of the second capacitor is at least 5% greater than the maximum capacitance of the piezo element.

6. A method for testing a piezo element of a vortex flow meter, the method comprising:

providing the vortex flow meter, including:

a measuring tube for guiding the medium with a measuring tube wall and a measuring tube lumen formed by the measuring tube wall, wherein the measuring tube wall has an opening;

a bluff body arranged in the measuring tube;

a sensor device designed to detect flow vortices caused by the bluff body, the sensor device including a paddle, a sensor main body, and a piezo element, wherein the sensor main body is arranged in the opening and seals media-tight with the measuring tube wall, wherein the paddle projects into the measuring tube lumen and is designed to be deflected by flow vortices from a force-free resting position, and wherein the piezo element is arranged on a rear side of the sensor main body facing away from the measuring tube and is designed to detect deformations of the sensor main body caused by deflections of the paddle and to convert the deformations into an electrical measurement signal; and an electronic operating circuit designed to detect and evaluate the measurement signal via an evaluation circuit and to provide flow measurement values, wherein the electronic operating circuit includes a measuring circuit including an operational amplifier having an inverting input, a non-inverting input and an output, and further includes a first capacitor, wherein the first capacitor forms a feedback between the output and the inverting input or the non-inverting input, wherein the respective input is a measurement input, wherein the respective other input is a reference input and can be supplied with a first reference voltage, and wherein the output is connected to the evaluation circuit of the electronic operating circuit, wherein the piezo element can be supplied with a second reference voltage on a side facing away from the operational amplifier, which is equal to the first reference voltage, wherein the measuring circuit further includes a first switch having a first position and a second position, wherein the electronic operating circuit is designed to connect the piezo element via the first position of the first switch to the measurement input of the operational amplifier and to charge the piezo element with a first charging voltage via the second position of the first switch, and wherein the electronic operating circuit is further designed to derive via the evaluation circuit from a discharge process of the piezo element an information relating to a state of the piezo element, and/or an electrical connection of the piezo element to the electronic operating circuit, and/or a mechanical connection to the sensor main body;

switching the first switch from its first position to its second position to charge the piezo element;

switching the first switch to its first position after charging the piezo element to discharge the piezo element; and detecting the discharge process via the electronic operating circuit and deriving an information relating to a state of the piezo element and/or an electrical connection of the piezo element from a discharge measurement signal.

7. The method according to claim 6, wherein the measuring circuit further includes a second capacitor and a second switch, the second switch having a first position and a second position, wherein the second capacitor can be supplied with the second reference voltage, wherein the electronic operating circuit is further designed to connect the second capacitor via the first position of the second switch to the measurement input of the operational amplifier and to charge the second capacitor with a second charging voltage via the second position of the second switch, wherein the first charging voltage and the second reference voltage define a first differential voltage, and wherein the second charging voltage and the second reference voltage define a second differential voltage, wherein the second differential voltage has a polarity opposite to the first differential voltage, and wherein the second capacitor and the piezo element can be connected in parallel via the respective first position of the first and second switches, the method further comprising:

during the method step of switching the first switch from its first position to its second position, switching the second switch from its first position to its second position to charge the second capacitor; and during the method step of switching the first switch to its first switch position, switching the second switch to its first switch position at the same time as the first switch to discharge the second capacitor.

* * * * *